US005342671A

United States Patent [19]

Stephenson

[11] Patent Number: 5,342,671

[45] Date of Patent: Aug. 30, 1994

[54] ENCODED DYE RECEIVER

[75] Inventor: Stanley W. Stephenson, Spencerport, N.Y.

[73] Assignee: Eastman Kodak Company, Rochester, N.Y.

[21] Appl. No.: 894,680

[22] Filed: Jun. 5, 1992

[51] Int. Cl.⁵ .................... B32B 9/00

[52] U.S. Cl. .................... 428/195; 428/900; 428/211

[58] Field of Search .................... 428/195, 900, 206, 207, 428/208, 209, 402, 211; 346/74.2, 74.5; 355/77; 235/382

[56] References Cited

U.S. PATENT DOCUMENTS

| | | | |
|---|---|---|---|
| 2,819,963 | 1/1958 | Hamm | 96/94 |
| 3,157,500 | 11/1964 | Abbott et al. | 96/28 |
| 3,515,590 | 6/1970 | Lazzarini et al. | 117/235 |
| 3,782,947 | 1/1974 | Krall | 96/67 |
| 4,150,781 | 4/1979 | Silverman et al. | 235/382 |
| 4,183,989 | 1/1980 | Tooth | 428/900 |
| 4,444,819 | 4/1984 | Maruta et al. | 346/209 |
| 4,738,949 | 4/1988 | Sethi et al. | 503/227 |
| 4,778,782 | 10/1988 | Ito et al. | 503/227 |
| 4,923,847 | 5/1990 | Ito et al. | 503/227 |
| 4,969,013 | 11/1990 | Tsilibes | 355/77 |
| 5,196,859 | 3/1993 | Tomiyama | 346/74.5 |

*Primary Examiner*—Patrick J. Ryan
*Assistant Examiner*—Patrick Jewik
*Attorney, Agent, or Firm*—Milton S. Sales

[57] ABSTRACT

A sheet for use in a printing process has an image receiving surface on one side and an invisible magnetic coating on the reverse side. The magnetic coating contains encoded data used to determine the nonrecording side of the sheet to prevent printing on the wrong side of the sheet. The encoded data is machine readable and contains information on the printing characteristics of the image receiving surface of the sheet.

7 Claims, 1 Drawing Sheet

ENCODED DYE RECEIVER

TECHNICAL FIELD

The present invention relates to printing, and, more particularly, to printing media having a single image receiving side and a method for always printing on only that one side.

BACKGROUND OF THE INVENTION

In certain types of printing machines, the sheet that will receive the image is fed into the machine for each image printed. Different sheets are used depending on the imaging method used and the results desired. For high quality, photographic-like printing, the sheets typically consist of a base layer of a heavily milled paper or a polymeric paper-like compound. To achieve a high quality image, the surfaces of these sheets must have a high degree of smoothness, or gloss.

The image formed on the sheet may be created by either adding dyes onto the surface, removing dyes pre-deposited on the surface, or by activating dyes that are contained on the surface. In all these cases, coatings must be applied over the substrate material to receive the dye bearing material. Often, several coatings are applied to the surface to optimize the dye receiving and retention characteristics of the sheet. In thermal printing, the core may consist of a substrate, a smoothing polymeric overcoat, a whitening overcoat and a transparent dye-receiving coating.

The coatings each perform a function. The smoothing coat may be an extruded, soft polymer, such as polyethylene or polypropylene, to improve the smoothness of the core material. The bright white layer may consist of, for example, titanium dioxide, in solvent deposited over the smoothing layer. The reflective layer may contain a high concentration of, for example, titanium dioxide, to achieve light densities of less than 0.06 D. A final, transparent layer receives the dyes. This layer may be transparent so that light passes through the layer and dyes, reflects off the high brightness coating, and is retransmitted out to the observer.

In thermal systems, this transparent coating must also sustain the high temperatures that occur during printing. The surface coating is typically formed of a clear polycarbonate. In thermal systems, another type of sheet is also used. This sheet is substantially transparent to allow transmission of light through all of the layers. The base layer is typically a clear polymer, the high reflectivity layer is omitted, and additional coatings retain the dyes and optimize the dye transfer process.

The same techniques and methods are applicable to printing processes other than thermal printing. In the case of ink jet printing systems or electrophotographic systems, the smoothness, high brightness, and transparent overcoat layers are all needed to optimize the quality of the image. Formulation of the dye receiving, and other layers, may change from system to system to optimize the image quality. For example, in ink jet systems, the dye receiving layer should receive the ink solvents readily and dry quickly. In electrophotographic systems, the surface should be optimized to receive the electrostatically charged toner particles and to retain them until the fusing process occurs.

Certain processes allow for the prepositioning of dyes within the imaging surface. One technology is traditional silver halide imaging wherein a series of light activated particles are disposed on a multiplicity of coatings on the image bearing surface. After the printing of the image, wet or damp chemistry is used to selectively develop the image imprinted on the image surface. Another, later technology uses microencapsulated, diazo-based compounds that are responsive to heat or pressure for image development. In all of these systems, high quality images need to meet the general requirements outlined for high quality thermal printed images.

For all of these technologies, the coatings on the base layer are expensive, and, typically, in manufacturing printing media and image receiving media, the polymer coatings are applied to each side of the base material to optimize the printing properties. It is highly desirable to reduce costs by applying the coating to only one side of the sheet. This approach, however, requires correct loading of the sheet in the printer. The one-sided receiver media is less expensive to produce, but it requires an operator to load the machine or otherwise use the media with the sheet in the correct orientation. Labels, tags, or discontinuities in the edge surface can be employed to ensure correct loading and use of the media. Unfortunately, machine detectable discontinuities and labels are typically discernable by the user and therefore undesirable, and may reduce the aesthetics of the completed image. Accordingly, it will be appreciated that it would be highly desirable to identify the image receiving surface without affecting the aesthetics of the finished image.

SUMMARY OF THE INVENTION

The present invention is directed to overcoming one or more of the problems set forth above. According to one aspect of the present invention, a sheet for use in a printing process has an image receiving surface on one side and an invisible (i.e., able to see through; transparent) magnetic coating on the reverse side. The magnetic coating contains encoded data used to determine the nonrecording side of the sheet to prevent printing on the wrong side of the sheet. The encoded data is readable and contains information on the printing characteristics of the image receiving surface of the sheet.

According to another aspect of the present invention, a method for use in a printing process for printing on only an image receiving side of a sheet of media comprises activating a sheet picking and feeding mechanism of a printer, detecting the presence of the media sheet, sensing the presence of a magnetic coating on one side of the media sheet and preventing printing if the magnetic coating is absent.

The magnetic coating can be applied to transparent media and remain invisible. More specifically, since the magnetic coating is transparent and not visually detectable, applying such a coating to a transparent media allows the transparent media to retain it transparent characteristic. With transparent media, no printing occurs on the non-image receiving side of the transparency with the magnetic coating. The coating can also contain information of the particular characteristics of the transparency to ensure high quality images.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
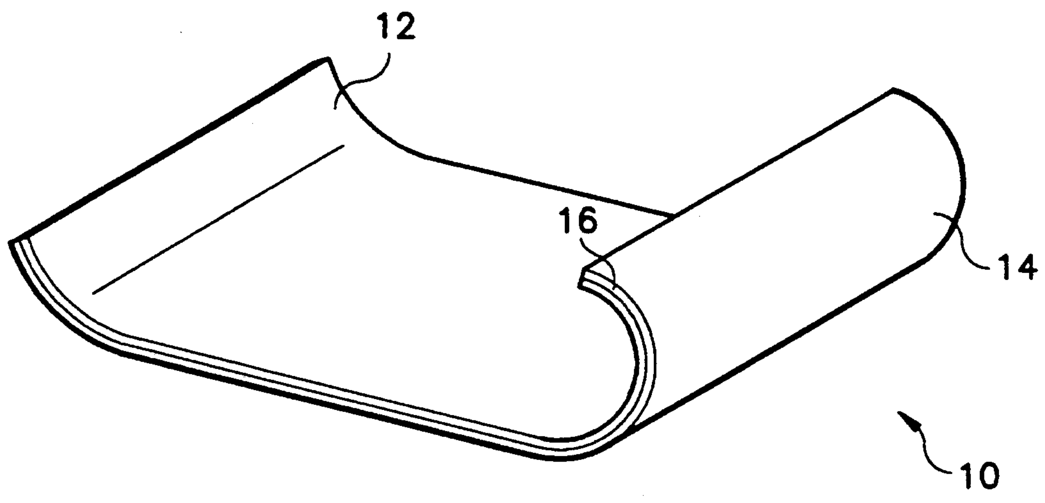
FIG. 1 is perspective view of a preferred embodiment of a sheet of receiver media curled to show both the front and back surfaces.
Figure 2:
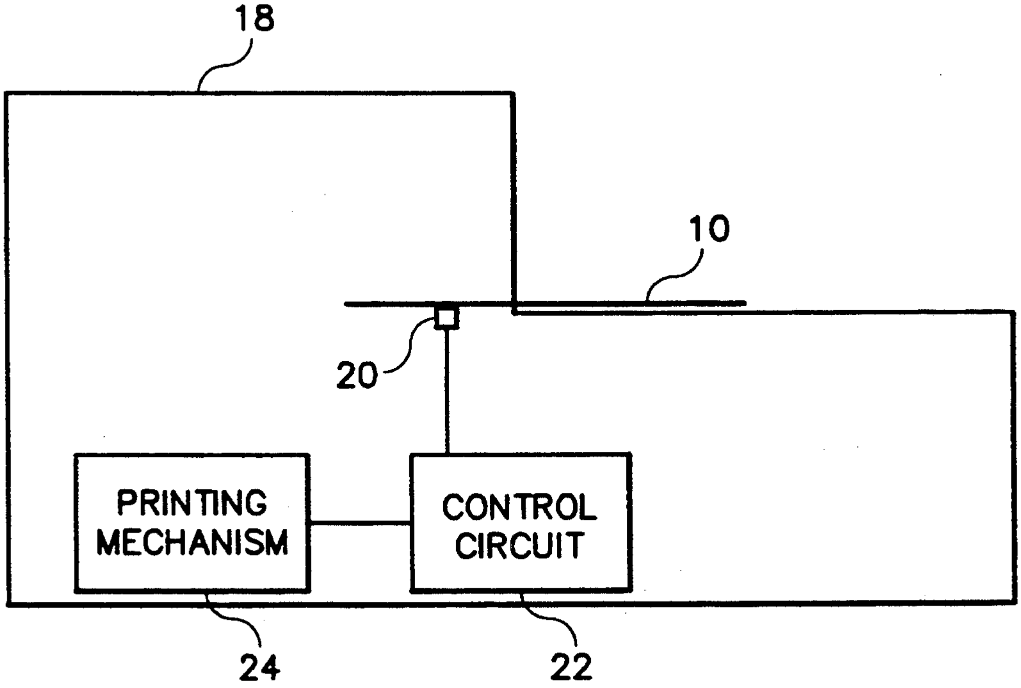
FIG. 2 is a diagrammatical view of a printer for using the media sheet of FIG. 1.

Referring to FIGS. 1–2, a dye receiver sheet 10 that can receive dye on only a single surface 12 incorporates a low density magnetic coating 14 on the reverse side 16. The coating 14 contains encoded information that is detectable by the printing machine 18. The recording 14 may be used to determine the orientation of the sheet prior to printing. Data pertinent to the printing properties can be encoded in the magnetic coating 14. The printing property information is read by the machine 18, via a magnetic head 20, for example, as each sheet is received to adjust machine printing parameters. The magnetic head 20 is electrically connected to a control circuit 22 for controlling the printing mechanism 24 of the thermal printer 18. Where multipart media 10 is used, the information on the dye stuff can also stored on the back 16 of the media sheet 10.

In certain types of printers, such as printer 18, the sheet 10 that will receive the image is fed into the machine 18 for each image printed. Different sheets are used depending on the imaging method used. The present invention improves the aesthetics of such images by providing sensing means 14 on the sheet that is not visually detectable. This is achieved by the addition of a low density dispersion of micro-fine magnetic particles disposed on the nonprinting side 16 of the image receiving sheet 10. The magnetic particles may be dispersed in the smoothing layer that is coextruded onto the paper core, or the magnetic particles may be dispersed in a coating that is applied to the nonimage side of the sheet. A nonprinting coating is sometimes applied during manufacture to reduce shingling or reduce static electricity that occurs when printing sheets are stacked. It is preferred that the magnetic particles be incorporated into the process that fabricates the nonprinting surface of the sheets. Because of the abrasive nature of of the magnetic particles, it is also desirable that they not be disposed in the image receiving surface of the sheet in the printing process where significant contact occurs with the image bearing surface during printing. Contact with the image bearing surface is a primary concern in thermal printing where the thermal print head is typically pressed firmly against the thermal media.

The application of the magnetic coating allows the encoding of information into each image receiving sheet during manufacture. Typically, the media is coated on large rolls and then cut to a customer desirable size. Machinery used in the paper finishing process may also be used for magnetic encoding on the magnetic coating. For example, a roller containing a fine pattern may be rolled against the sheet during the finishing process. Or, a magnetic gap may be modulated as the sheet is passed over the gap to create a pattern of counter polarized magnetic domains in the coating.

Referring to FIG. 2, in the thermal printer 18 receiving the media 10, there is a magnetic head 20 disposed to sense the presence of the factory encoded tracks. Because the magnetic recording 14 must be sensed within a coating of about three thousandths of an inch, and the media 10 is typically substantially over this thickness, the recording 14 is detectable only when the magnetized surface 16 is facing the sensing means 20. Thus, the recording 14 can be used to verify sheet orientation within these printers 18. The printing sequence would be implemented by activating the sheet picking and feeding mechanism of the printer 18, sensing the presence of the magnetic recording 14, detecting passage of media 10, and preventing printing if the recording 14 is absent and media 10 is present in the sensing station where the magnetic head 20 is located. If an error is detected, acoustic or visual means, such as a bell, buzzer or light, can be disposed in the printer 18 to notify the machine operator, or the sheet 10 can pass through the machine without activation of the printing mechanism 24.

The magnetic recording may contain machine readable information on the reverse side of the sheet to indicate the printing parameters. This information typically covers the dye reception rate of the sheet. The imaging response of the media is dependent only upon the properties of the sheet itself. A sheet may contain information not only on the imaging properties of the sheet, but also additional components of the printing system. In the case of thermal printing, the media consists of a dye receiving member and a dye donating member. These elements are typically sold as a set, and the recording on the image receiving sheet can contain information on both elements, In the case of ink jet printers, the information encoded can cover not only the properties of the sheet, but also the liquid dyes. In the case of electrophotographic printers, the recording can contain information on both the sheet and the toner. In photographic printers, the recording can contain information on the sheets and associated liquid chemistry.

Operation of the present invention is believed to be apparent from the foregoing description, but a few words will be added for emphasis. The media sheet 10 is inserted into the media pathway of the printer 18. A magnetic head 20 tries to sense the magnetic coating 14 on the reverse side 16 of the media sheet 10. If sensed, the controller alerts the printer mechanisms 24 to begin printing. If the media sheet 10 contains printing data, that data is used by the controller 22 and printer mechanisms 24 to provide a quality print based on the media characteristics. If not sensed, the controller 22 alerts the printer mechanism 24 that a correctly inserted media sheet is not present and printing does not occur. The printer may run the media sheet through or may simply give a visual or audible indication that a properly oriented media sheet is not present.

It can now be appreciated that there has been described a magnetic coating on image receiving or image bearing material, such as silver halide emulsion, thermal media, ink jet and electrophotographic systems. A method is disclosed for providing encoded data on dye receiving members, such as are used in thermal printers. A use of the invention is as a dye receiver orientation method for transparencies in the field of thermal printing so that the image is always printed on the correct side of the media.

It can also be appreciated that there has been presented a media sheet wherein magnetic particles in the coating provide machine readable sensitometry data. Data pertinent to the printing properties is be encoded in the magnetic coating. The printing property information is read by the machine as each sheet is received to adjust machine printing parameters.

The present invention improves the aesthetics of such images by providing sensing means on the sheet that is not visually perceptible and does not interfere with image transfer. This is achieved by the addition of a low density dispersion of micro-fine particles disposed on the nonprinting side of the image receiving sheet.

While the invention has been described with particular reference to the preferred embodiments, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled the art. For example, while the invention has been described in terms of identifying the image receiving surface without affecting the aesthetics of the finished image, the present invention optimizes print quality by taking the characteristics or a particular manufacturing run of media into account by informing the printer controller and printing mechanisms of the media characteristics and printing parameters. It is accordingly intended that the claims shall cover all such modifications and applications as do not depart from the true spirit and scope of the invention.

What is claimed is:

1. A dye receiver sheet for receiving an image according to a thermal dye transfer process in which a dye donor sheet is imagewise heated to transfer dye to said dye receiver sheet, said dye receiver sheet comprising:

a base having first and second sides, and an image region within which an image can be received;

at least one layer on said first side adapted to receive an image within said image region according to a thermal dye transfer process; and a transparent magnetic layer on said second side, said transparent magnetic layer being at least partially within said image region.

2. A dye receiver sheet as defined in claim 1 wherein said base is transparent.

3. A dye receiver sheet as defined in claim 1 wherein said base is opaque.

4. A dye receiver sheet as defined in claim 1 wherein information has been recorded on said transparent magnetic layer.

5. A dye receiver sheet as defined in claim 4 wherein said information includes printing characteristics of said dye receiver sheet.

6. A dye receiver sheet for receiving an image according to a thermal dye transfer process, said dye receiver sheet comprising:

a base having first and second sides, and an image region within which an image can be received;

at least one layer on said first side adapted to receive an image within said image region according to a thermal dye transfer process; and a transparent magnetic layer on said second side which includes recorded information related to printing characteristics of said dye receiver sheet, said transparent magnetic layer being at least partially within said image region.

7. A dye receiver sheet for receiving an image according to a thermal dye transfer process in which a dye donor sheet is imagewise heated to transfer dye to said dye receiver sheet, said dye receiver sheet comprising:

a base having an image region within which an image can be received;

one layer adapted to receive an image within said image region according to a thermal dye transfer process; and a transparent magnetic layer, said transparent magnetic layer being at least partially within said image region.

* * * * *